(12) United States Patent
Morita et al.

(10) Patent No.: US 12,145,524 B2
(45) Date of Patent: Nov. 19, 2024

(54) VEHICULAR AIRBAG DEVICE

(71) Applicant: Autoliv Development AB, Vargarda (SE)

(72) Inventors: Kazuki Morita, Kanagawa (JP); Kazuhiro Abe, Kanagawa (JP); Keitoku Miyagi, Kanagawa (JP)

(73) Assignee: Autoliv Development AB, Vårgårda (SE)

( * ) Notice: Subject to any disclaimer, the term of this patent is extended or adjusted under 35 U.S.C. 154(b) by 0 days.

(21) Appl. No.: 17/996,740

(22) PCT Filed: Apr. 14, 2021

(86) PCT No.: PCT/JP2021/015468
§ 371 (c)(1),
(2) Date: Oct. 20, 2022

(87) PCT Pub. No.: WO2021/215331
PCT Pub. Date: Oct. 28, 2021

(65) Prior Publication Data
US 2023/0219516 A1  Jul. 13, 2023

(30) Foreign Application Priority Data

Apr. 24, 2020  (JP) ................................. 2020-077011

(51) Int. Cl.
  *B60R 21/203*  (2006.01)
  *B60R 21/2338*  (2011.01)
  *B60R 21/239*  (2006.01)

(52) U.S. Cl.
  CPC ........ *B60R 21/203* (2013.01); *B60R 21/2338* (2013.01); *B60R 21/239* (2013.01)

(58) Field of Classification Search
  CPC . B60R 21/203; B60R 21/2338; B60R 21/239; B60R 2021/23382; B60R 2021/23384; B60R 2021/2395
  See application file for complete search history.

(56) References Cited

U.S. PATENT DOCUMENTS 8,070,183 B2 * 12/2011 Kumagai ............ B60R 21/2338
                                                             280/736
8,353,532 B2 *  1/2013 Abe .................... B60R 21/2338
                                                             280/739
(Continued)

FOREIGN PATENT DOCUMENTS

JP     2008-201214 A   9/2008
JP     2010-173620 A   8/2010
(Continued)

*Primary Examiner* — Paul N Dickson
*Assistant Examiner* — Tiffany L Webb
(74) *Attorney, Agent, or Firm* — Matthew D. Thayne; Thayne and Davis LLC

(57) ABSTRACT

Airbag devices for a vehicle. The airbag cushion may include a gas discharge section, a first tether, and a chamber having an occupant side panel and a steering wheel side panel. The first tether may include a first end directly or indirectly connected to the occupant side panel and second ends connected to the steering wheel side panel. The edge of the gas discharge section can be pulled into the chamber by the taut first tether and the area of the gas discharge section opening with the edge of the gas discharge section pulled into the chamber is smaller than when the first tether is relaxed.

16 Claims, 15 Drawing Sheets

(56) References Cited

U.S. PATENT DOCUMENTS

| | | | | |
|---|---|---|---|---|
| 8,419,054 | B2* | 4/2013 | Abe | B60R 21/239 |
| | | | | 280/739 |
| 9,333,939 | B2* | 5/2016 | Koshikawa | B60R 21/203 |
| 9,403,504 | B2* | 8/2016 | Umehara | B60R 21/239 |
| 11,130,468 | B2* | 9/2021 | Baba | B60R 21/2338 |
| 2012/0074677 | A1* | 3/2012 | Hiruta | B60R 21/2338 |
| | | | | 280/739 |
| 2019/0308583 | A1* | 10/2019 | Baba | B60R 21/2338 |

FOREIGN PATENT DOCUMENTS

| | | |
|---|---|---|
| JP | 2013-193492 A | 9/2013 |
| JP | 2016-13712 A | 1/2016 |
| JP | 2016-22751 A | 2/2016 |
| JP | 2018-172013 A | 11/2018 |
| WO | 2017/212839 A1 | 12/2017 |

* cited by examiner

FIG. 1
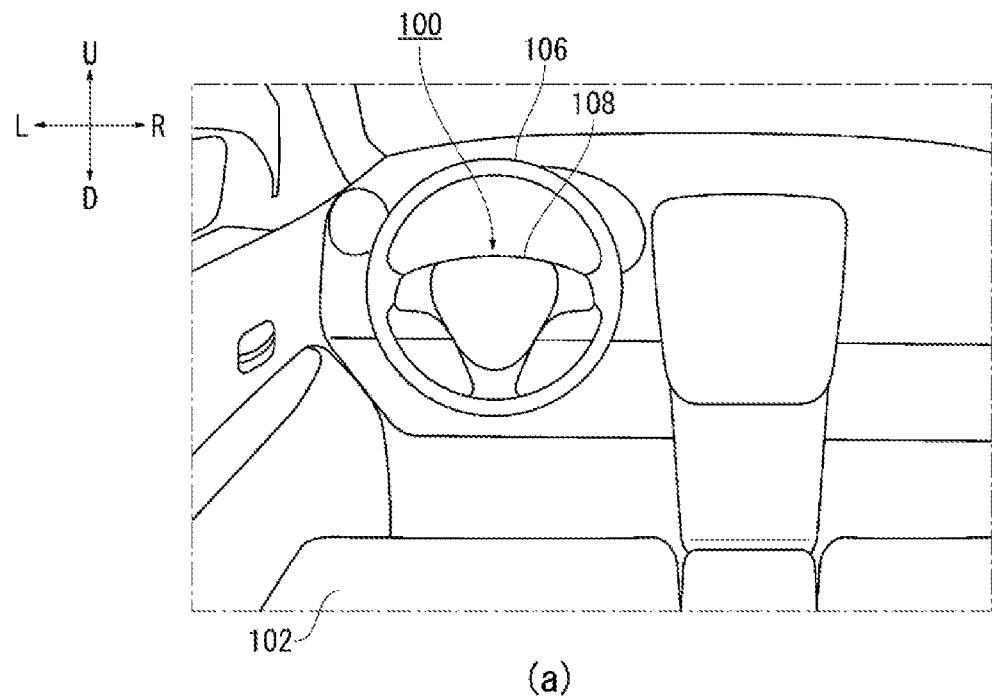
(a)
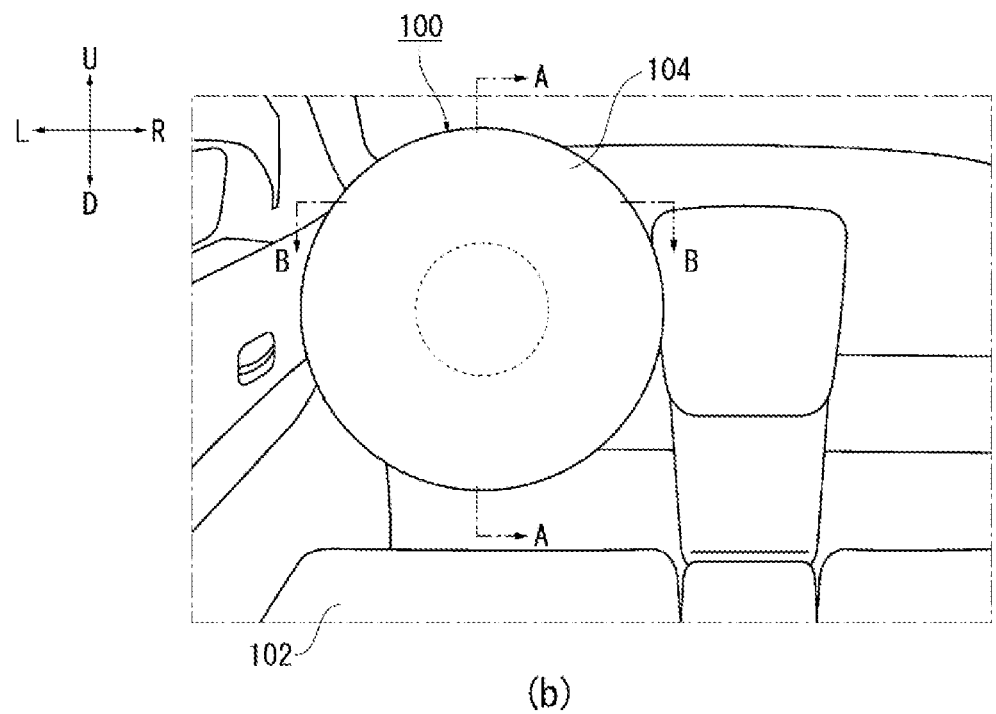
(b)

FIG. 2
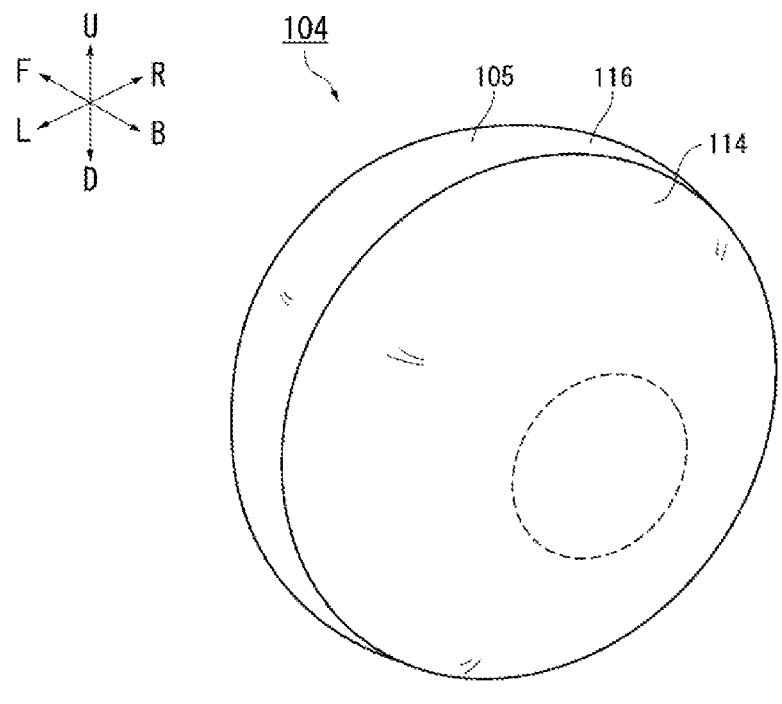
(a)
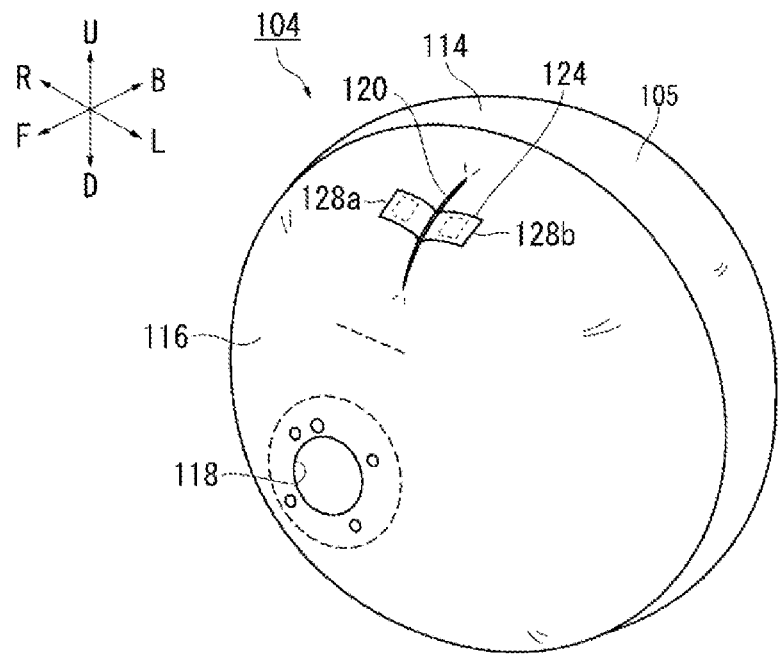
(b)

FIG. 3
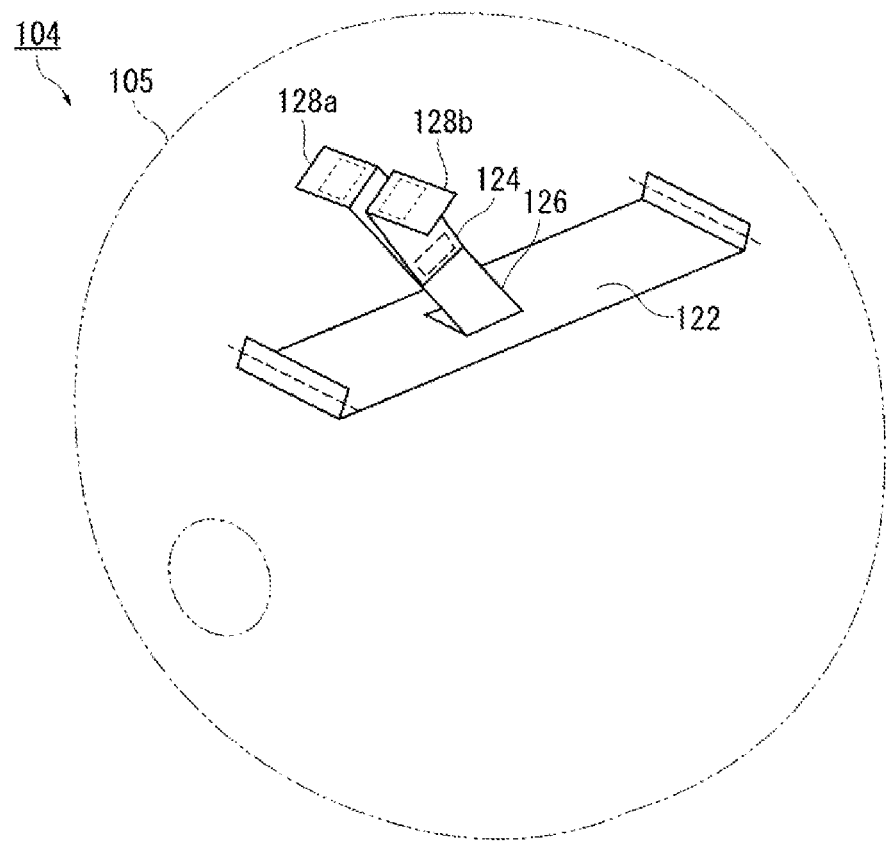
(a)
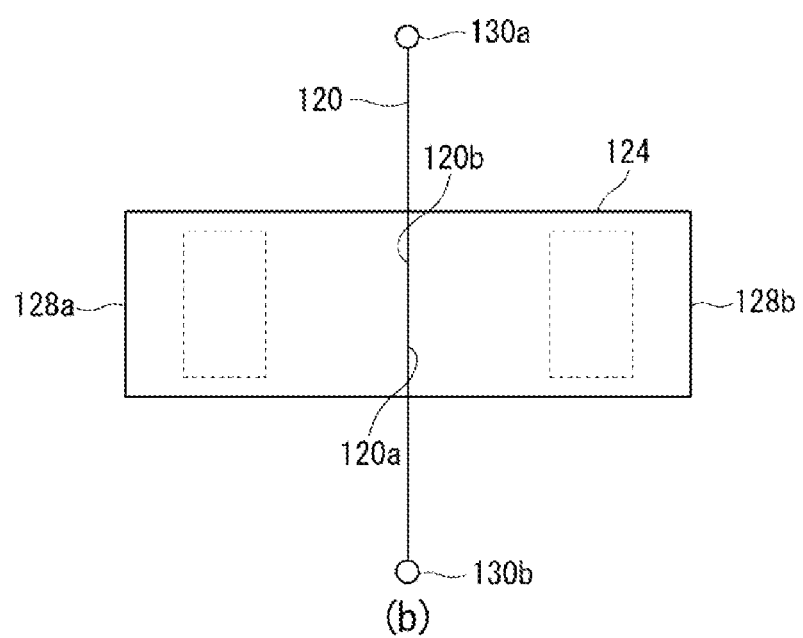
(b)

FIG. 6
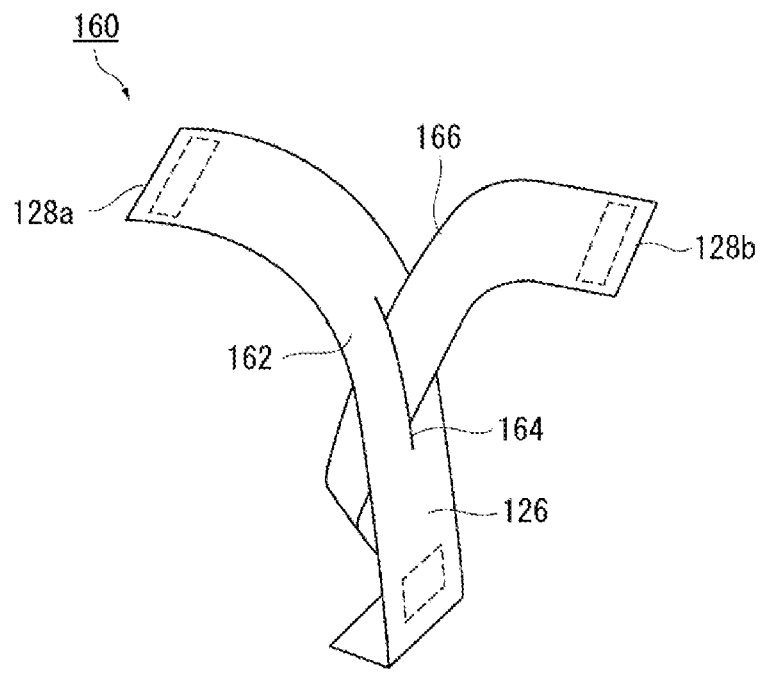
(a)
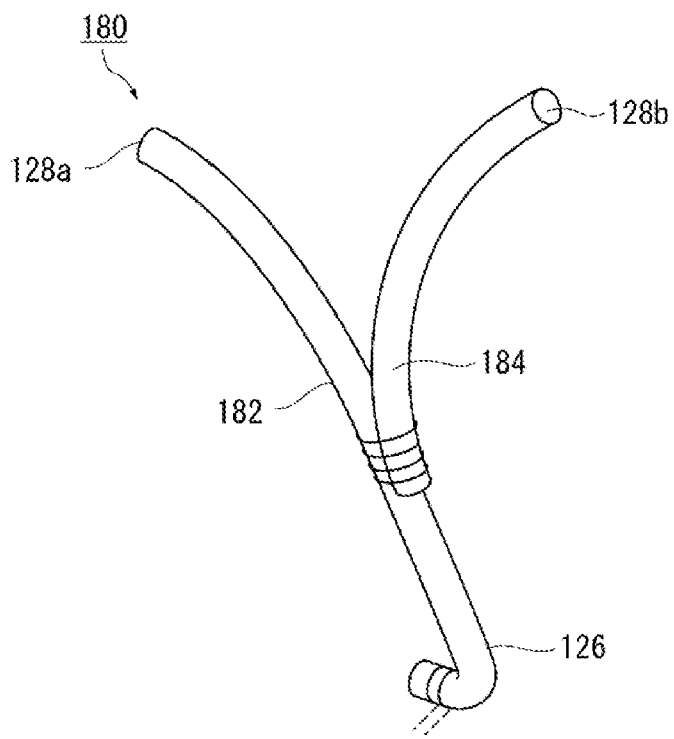
(c)

FIG. 7
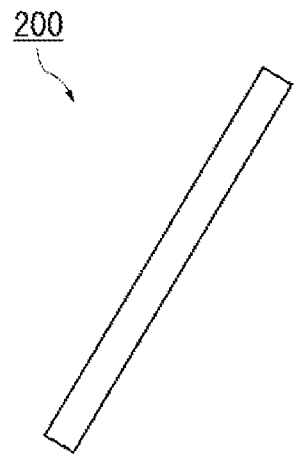
(a)
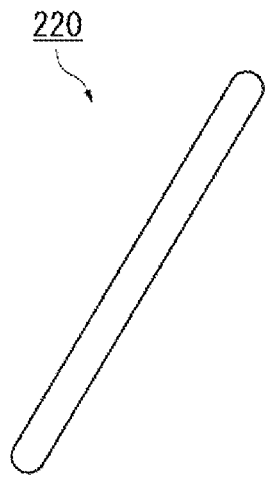
(b)
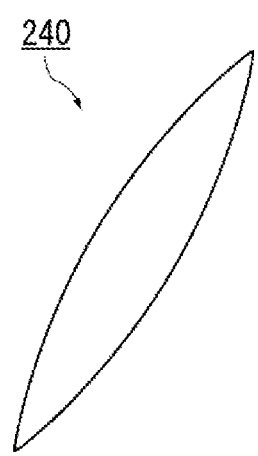
(c)

FIG. 8
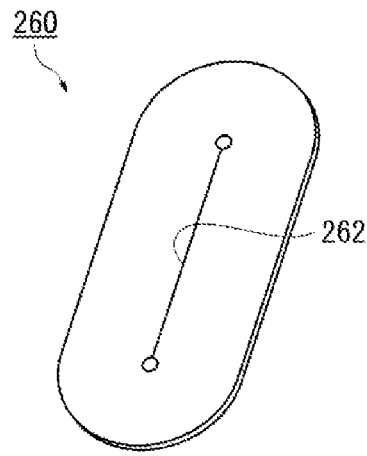
(a)
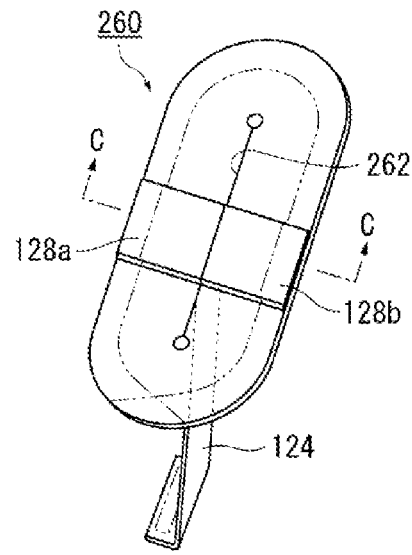
(b)
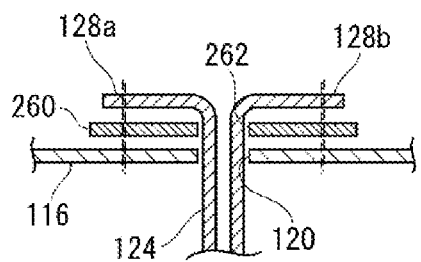
C-C
(c)
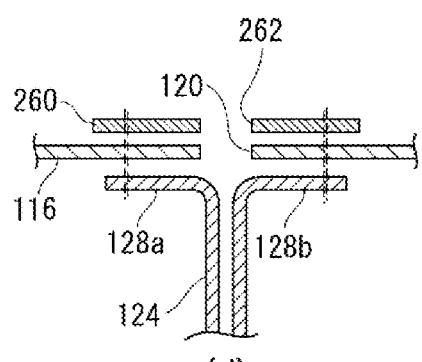
(d)
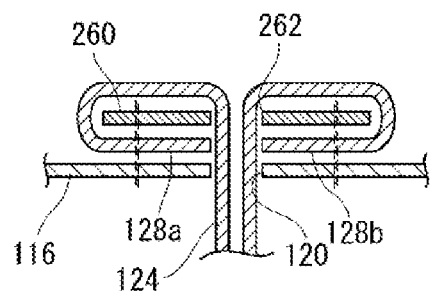
(e)
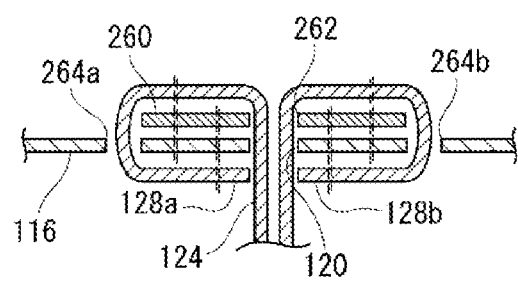
(f)

FIG. 9
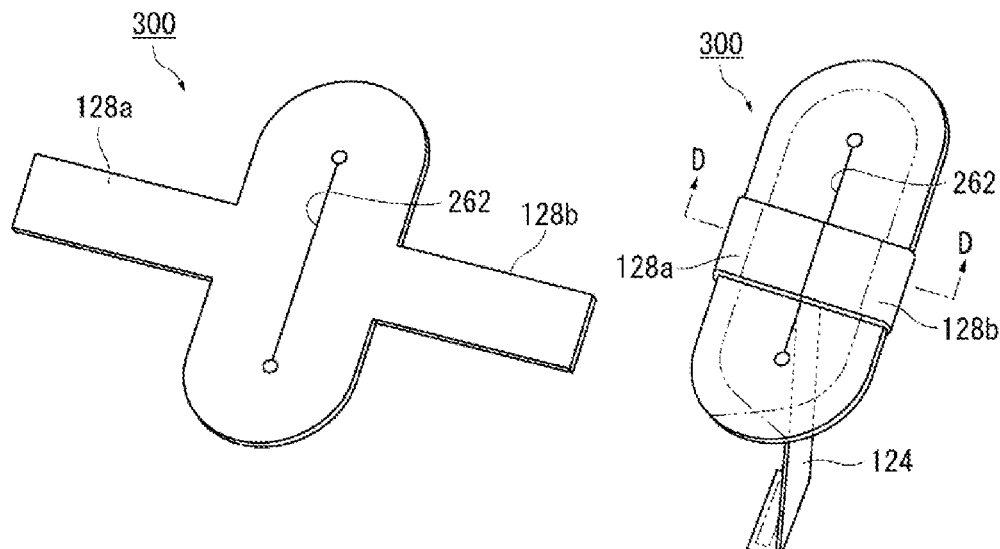
(a) (b)
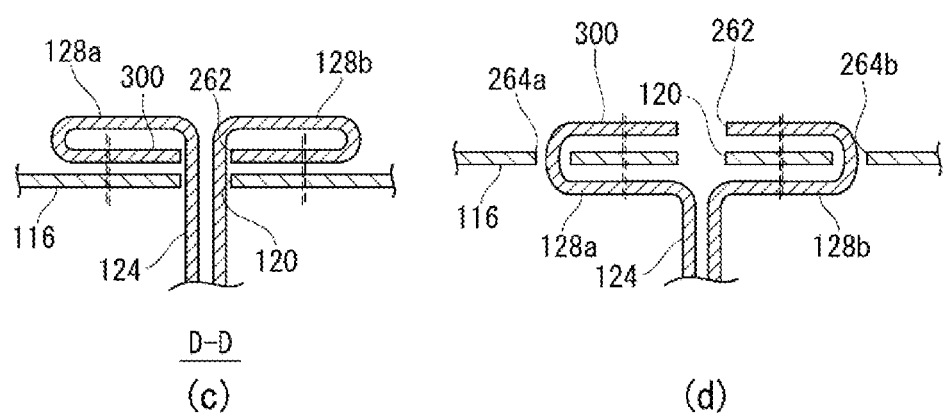
D-D
(c) (d)

(a)

(b)

(c)

(d)

FIG. 11
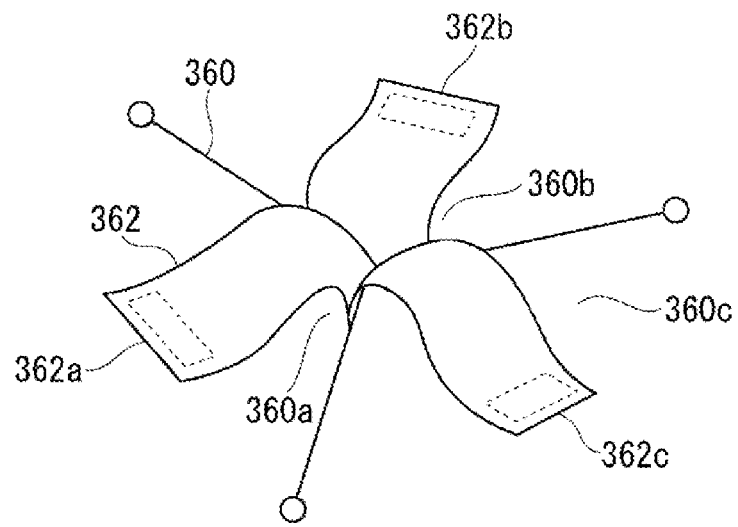
(a)
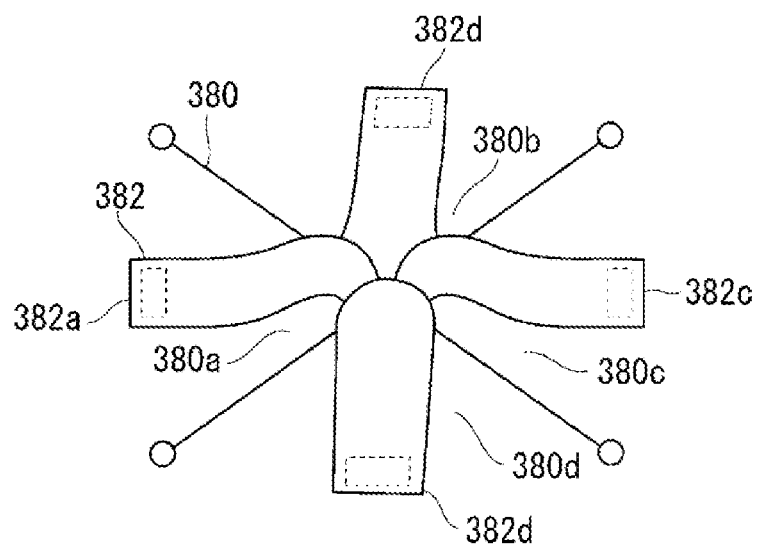
(b)

FIG. 14
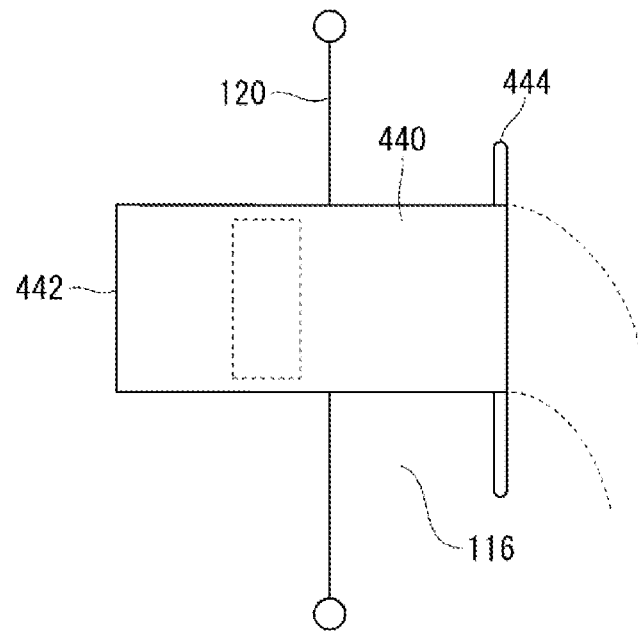
(a)
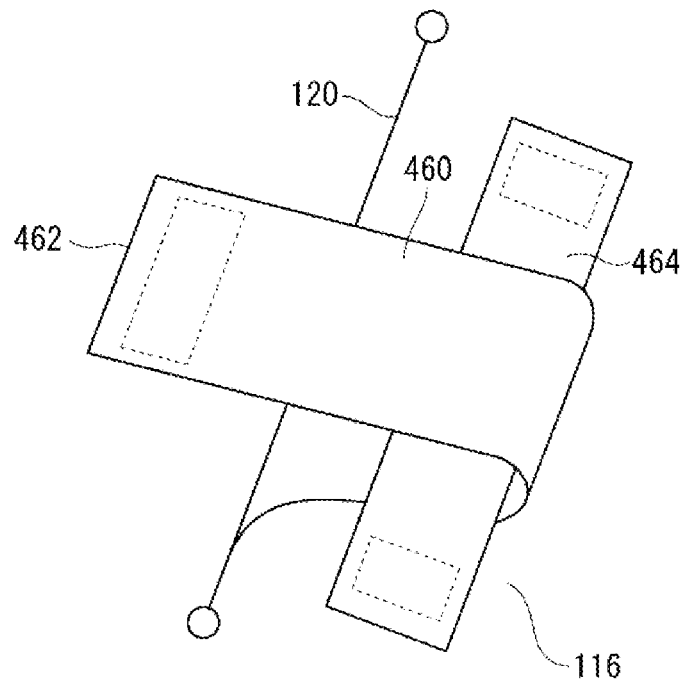
(b)

FIG. 15
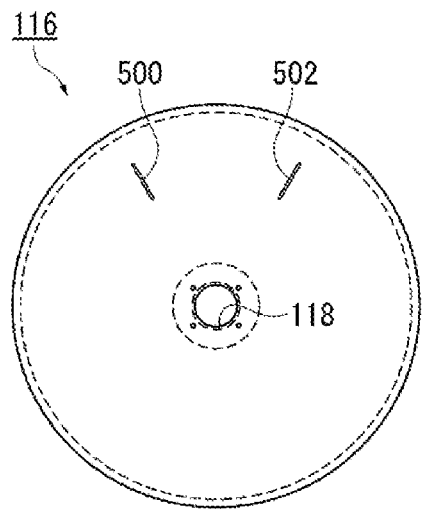
(a)
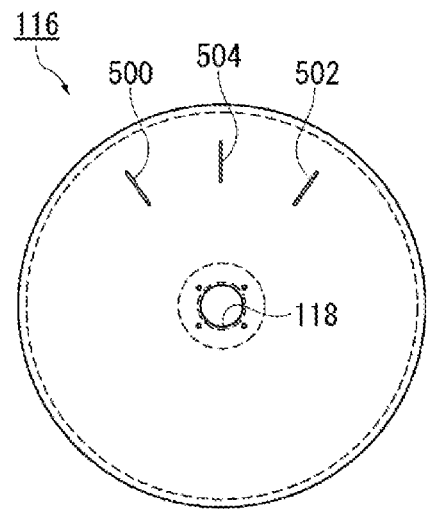
(b)
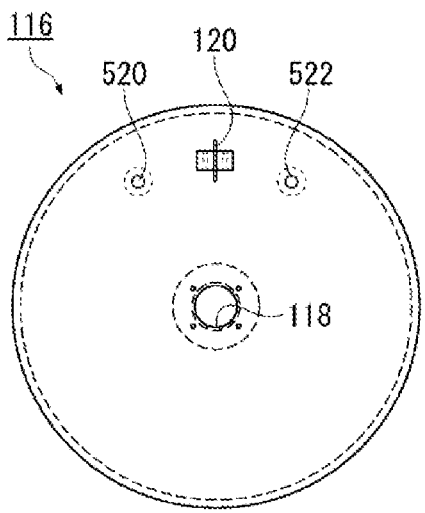
(c)
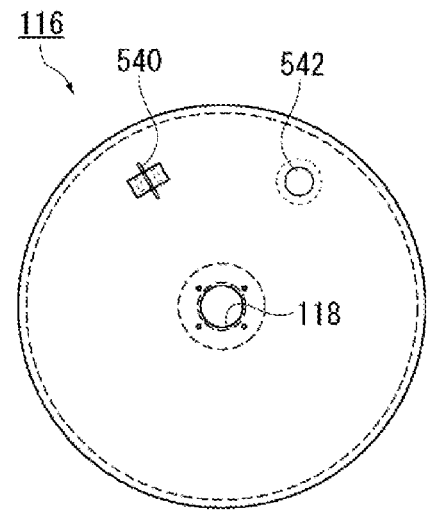
(d)

VEHICULAR AIRBAG DEVICE

TECHNICAL FIELD

The present invention relates to a vehicle airbag device for restraining an occupant in an emergency.

BACKGROUND TECHNOLOGY

Airbag devices have generally become standard equipment in vehicles in recent years. An airbag device is a safety device that is actuated in the event of an emergency such as a vehicle collision or the like to receive and protect an occupant by expanding and deploying a bag-shaped airbag cushion with gas pressure.

There are various types of vehicle airbag devices depending on the installation site and application. For example, a front airbag device is provided in a center of a steering wheel in order to protect a driver from a collision in a front-back direction. In addition, a curtain airbag device is provided in the vicinity of a ceiling above a side window, and a side airbag device is provided on a side part of a seat to protect an occupant from an impact in a vehicle width direction due to a side collision or the like.

An airbag cushion of a general airbag device is equipped with an inflator that supplies gas and provided with a vent hole that discharges the gas externally. Currently, mechanisms for adjusting the amount of gas discharged from a vent hole have been developed and the internal pressure of the airbag cushion is set by various factors.

For example, in Patent Document 1, as disclosed in FIG. 8, an internal pressure adjustment mechanism 30 is provided near the exhaust opening 27 of airbag 19. The internal pressure adjustment mechanism 30 primarily includes a cylindrically shaped opposing sheet part 34 and two tethers 32. With the technology of Patent Document 1, exhaust is suppressed by the tether 32 becoming taut and pulling on the exit of the opposing sheet 34, and there is indication that when the occupant comes into contact with the airbag 19, the tether 32 relaxes enabling exhausting from the exit of the opposing sheet 34.

PRIOR ART DOCUMENTS

Patent Documents

Patent Document 1: Japanese Unexamined Patent Application 2018-172013

SUMMARY OF THE INVENTION

However, the internal pressure adjustment mechanism 30 of Patent Document 1 requires providing a cylindrical opposing sheet part 34 that protrudes and expands from the airbag 19 and the structure is complicated and so there is room for simplification and for improvement in terms of cost reduction.

Problem to be Solved by the Invention

In light of these issues, an object of the present invention is to provide an airbag device for a vehicle with a simplified structure having improved occupant restraint performance and improved safety.

Means for Solving the Problems

In order to resolve the problems described above, a typical structure of an airbag device for a vehicle according to the present invention includes:

an inflator provided on a prescribed location of the vehicle; and an airbag cushion that receives gas from the inflator and expands and deploys between the steering wheel and an occupant in the driver seat; wherein the airbag cushion includes:

a chamber for gas accumulation formed in a bag shape including an occupant side panel positioned on the occupant side and a steering wheel side panel positioned on the steering wheel side, a notched gas discharge section that is cut in a prescribed location of the steering side panel along a prescribed line, and a first tether extending over a prescribed location of the chamber, the first tether includes:

a first end connected to the occupant side panel inside the chamber or near the occupant side panel, and one or a plurality of second ends connected to the steering wheel side panel, the one or a plurality of second ends of the first tether are connected near the edge of the gas discharge section of the steering wheel side panel of the chamber, the edge of the gas discharge section can be pulled inside the chamber by a taut first tether, and the area of the gas discharge section opening in a state of the edge of the gas discharge section being pulled inside the chamber is smaller than when the first tether is relaxed.

Upon completion of expansion and deployment, the first tether of the airbag cushion described above is taut and the area of the gas discharge section opening is reduced. Furthermore, when the occupant comes into contact with the occupant side panel of the chamber, the first tether relaxes, increasing the area of the gas discharge section opening. Therefore, the amount of gas discharged is reduced until the occupant comes into contact with the airbag cushion enabling retaining pressure in the chamber, and when the occupant comes into contact with the occupant side panel, gas discharge amount increases suppressing the load imparted to the occupant. Therefore, with the configuration described above, an airbag device for a vehicle that can be inexpensively implemented, has a simple structure, and that improves occupant restraint performance and safety, can be provided.

The edge of the gas discharge section described above may be pulled inside the chamber by the taut first tether when the chamber is filled with gas.

With the configuration described above, pulling of the edge of the gas discharge section into the chamber reduces the area of the gas discharge section opening and this enables suppressing the amount of gas that is discharged.

The first end of the first tether described above may be connected to the occupant side panel of the chamber. This configuration enables implementing a suitable airbag cushion having the aforementioned advantageous effects.

The airbag cushion described above may further include a second tether that extends from the occupant side panel to the steering wheel side panel inside the chamber, and the first end of the first tether may be connected to a prescribed location on the second tether and thus connected to the occupant side panel or near the occupant side panel via the second tether. This configuration also enables implementing a suitable airbag cushion having the aforementioned advantageous effects.

The first tether described above may be a band shape or cord shape. This structure enables implementing a first tether with a simple structure.

The width of the one or a plurality of second ends of the first tether described above may be smaller than the length of the gas discharge section in the longitudinal direction. A first tether of this configuration does not hinder discharge of gas from the gas discharge section and so is advantageous.

The one or plurality of second ends of the first tether described above may pass over the gas discharge section, be exposed outside the steering wheel side panel, and be connected to the outside of the steering wheel side panel near the gas discharge section.

When the first tether is taut, the configuration described above enables the area around the gas discharge section of the steering wheel side panel to efficiently be pulled inside the chamber.

The airbag cushion described above may further include a first reinforcement patch attached on the outside of the chamber around the gas discharge section of the steering wheel side panel and the one or plurality of second ends of the first tether may be connected to the first reinforcement patch.

With the configuration described above, the area around the gas discharge section is reinforced preventing damage and when the first tether is taut, the area around the gas discharge section of the steering wheel side panel can efficiently be pulled inside the chamber.

The airbag cushion described above may further include a second reinforcement patch attached on the outside of the chamber around the gas discharge section of the steering wheel side panel and the one or plurality of second ends of the first tether may be integrally connected to the second reinforcement patch.

With the configuration described above as well, the area around the gas discharge section is reinforced preventing damage and when the first tether is taut, the area around the gas discharge section of the steering wheel side panel can efficiently be pulled inside the chamber.

The airbag cushion described above may further include a prescribed slit formed near a first edge of the gas discharge section and the one or plurality of second ends of the first tether may be exposed to the outside of the chamber through the slit, pass over the gas discharge section, and be connected near a second edge of the gas discharge section outside of the chamber.

This configuration described above also enables achieving adjustment to the amount of gas discharged from the gas discharge section by use of a first tether.

Herein, one second end of the first tether may be provided, the second end may be connected on the outside of the chamber near the edge of the gas discharge section, the airbag cushion may further include a prescribed loop part provided near the edge of the gas discharge section on the opposite side of the edge that the second end of the first tether is connected to, and the first end of the first tether may pass over the gas discharge section, may be folded back at the loop part, and may be inserted through the gas discharge section into the chamber.

This configuration also enables achieving adjustment to the amount of gas discharged from the gas discharge section by use of a first tether.

A plurality of second ends of the first tether described above may be provided where the plurality of second ends may respectively be connected near opposing edges of the gas discharge section.

The configuration described above also enables pulling of the edge of the gas discharge section into the chamber to reduce the area of the gas discharge section opening and suppress the amount of gas that is discharged.

The gas discharge section may be cut in a straight line, notched in a rectangular shape, or notched in an oval shape, the plurality of second ends of the first tether may be two, and the two second ends of the first tether may be respectively connected near the center of the opposing two long sides of the edges of the straight line shaped, rectangular shaped, or oval shaped gas discharge section.

The gas discharge section and first tether of the configuration described above provide a simple configuration that suppresses the amount of gas discharged when expansion and deployment of the airbag cushion is complete and enables increasing the amount of gas discharged when the occupant comes into contact with the airbag cushion.

The gas discharge section described above may be formed by a plurality of cuts along intersecting lines at a prescribed location of the steering wheel side panel forming a plurality of free ends on the edges of the gas discharge section and the plurality of second ends of the first tether may respectively be connected to the plurality of free ends formed on the edges of the gas discharge section.

The gas discharge section and first tether of the configuration described above also provide a simple configuration that suppresses the amount of gas discharged when expansion and deployment of the airbag cushion is complete and enables increasing the amount of gas discharged when the occupant comes into contact with the airbag cushion.

Effect of the Invention

The present invention enables providing an airbag device for a vehicle with a simple configuration having improved occupant restraint performance and improved safety.

BRIEF DESCRIPTION OF THE DRAWINGS

FIG. 1 is a diagram illustrating the outline of a vehicle airbag device according to an Embodiment of the present invention.

FIG. 2 is a perspective view illustrating the airbag cushion in FIG. 1(b) from each direction during expansion and deployment.

FIG. 3 illustrates the structure around the sub-tether of FIG. 2(b).

FIG. 6 illustrates a modified example of the sub-tether of FIG. 3.

FIG. 7 illustrates a modified example of a vent hole in FIG. 3(b).

FIG. 8 illustrates a first reinforcement patch that can be attached around the vent hole on the steering wheel side panel.

FIG. 9 illustrates a second reinforcement patch that can be attached around the vent hole on the steering wheel side panel.

FIG. 11 is a further Modified Example of the vent hole and sub-tether of FIG. 3(b).

FIG. 14 illustrates a further Modified Example of the first tether of FIG. 3(b).

FIG. 15 illustrates a further Modified Example of the gas discharge section of FIG. 2(a).

MODE FOR CARRYING OUT THE INVENTION

Figure 4:
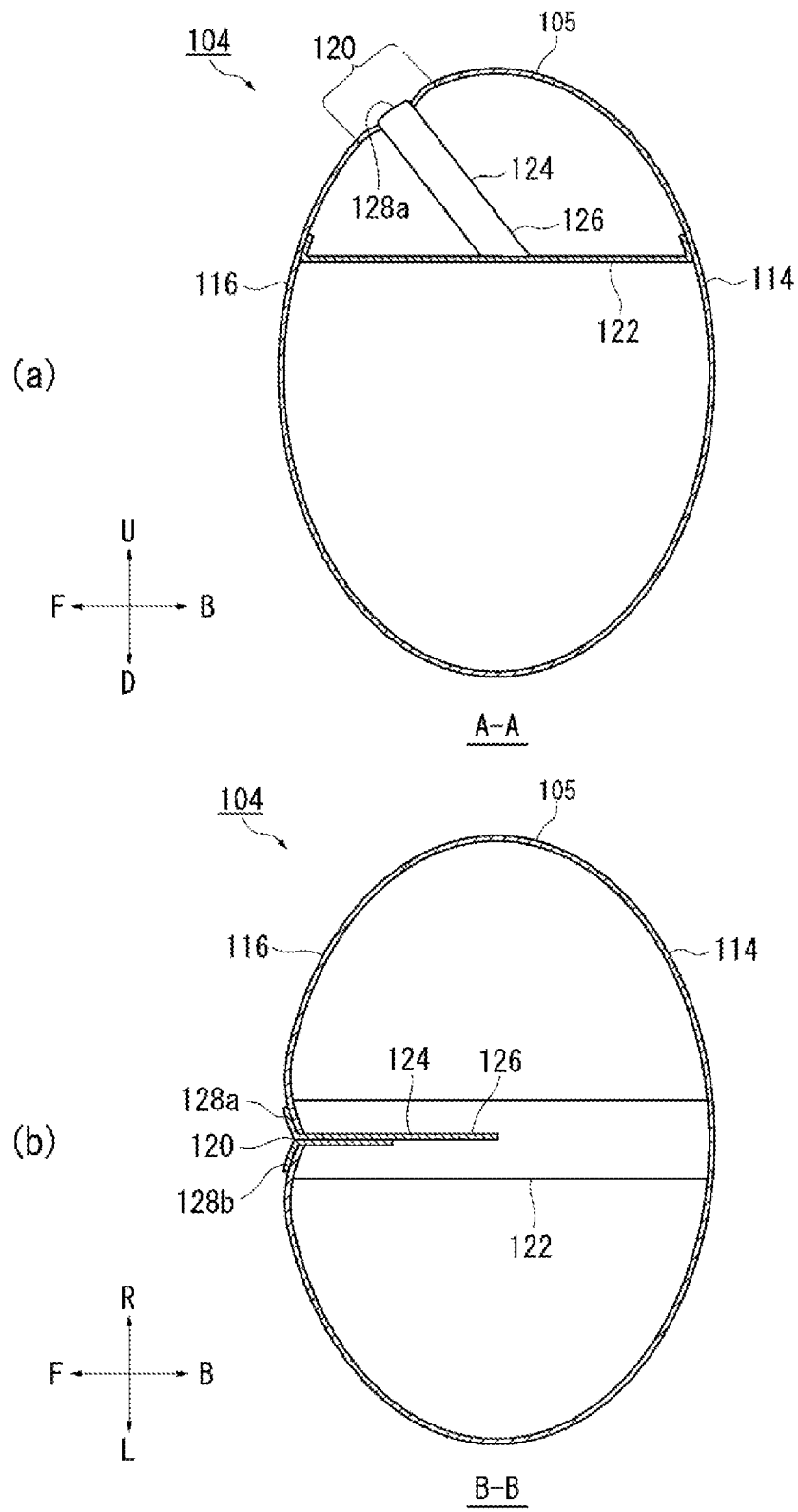
FIG. 4 is various cross-sectional views of the airbag cushion of FIG. 1(b).

Preferred Embodiments according to the present invention will hereinafter be described in detail with reference to the attached drawings. Dimensions, materials, other specific numerical values, and the like indicated in the Embodiments are merely examples for ease of understanding of the invention and do not limit the present invention unless otherwise noted. Note that in the present specification and drawings, elements having essentially identical functions and configurations are labeled with identical symbols in order to omit redundant descriptions along with an illustration of elements not directly related to the present invention.

FIG. 1 illustrates an overview of the vehicle airbag device (hereinafter, airbag device 100) according to an Embodiment of the present invention. FIG. 1(a) is a view illustrating a vehicle prior to the operation of the airbag device 100. Hereinafter, regarding FIG. 1 and other diagrams, a vehicle front-rear direction is illustrated by the symbols F (Front) and B (Back), a vehicle width direction of the vehicle by the symbols L (Left) and R (Right), and a vehicle up-down direction by the symbols U (Up) and D (Down).

The airbag device 100 is applied in the present Embodiment as the airbag for the driver's seat for vehicles with a steering wheel on a left side (front row left side seat 102). Hereinafter, explanations are made assuming the front row left side seat 102, for example, a vehicle outer side in the vehicle width direction (hereinafter, outer vehicle side) refers to a left side of the vehicle, and a vehicle inner side in the vehicle width direction (hereinafter, vehicle inner side) refers to a right side of the vehicle. Furthermore, with regard to the present Embodiment, a front direction is described as "front" and a back side direction is described as "rear" as viewed from an occupant normally seated in the seat 102. Similarly, the right hand direction of a normally seated passenger is described as "right" while the left hand direction is described as "left". Furthermore, with regard to the center of the passenger's body at this time, the direction toward the head is "up" while the direction toward the legs is "down."

The airbag cushion 104 (see FIG. 1(b)) of the airbag device 100 is stowed in a folded or rolled state or the like in front of a regular seating position of the seat 102, inside a central hub 108 of a steering wheel 106. An inflator that supplies gas (not shown) is also stowed inside the hub 108 together with the airbag cushion 104. When a vehicle impact occurs, a signal from a sensor (not shown) is sent to the inflator and gas is supplied from the inflator to the airbag cushion 104.

FIG. 1(b) illustrates a vehicle after the expansion and deployment of the airbag cushion 104 of the airbag device 100. Upon receiving gas from the inflator, the airbag cushion 104 cleaves the surface cover of the hub 108 and expands and deploys between the steering wheel 106 (see FIG. 1(a)) and an occupant in the driver seat, restraining the torso and head of the occupant that is tending to move forward. The airbag cushion 104 has a circular shape as seen from the seating position side, and is formed with a plurality of base fabrics that make up the surface and are layered through sewing or adhesion.

FIG. 2 is a perspective view illustrating the airbag cushion 104 in FIG. 1(b) from each direction during expansion and deployment. FIG. 2(a) illustrates the airbag cushion 104 of FIG. 1(b) as viewed from the upper left in the vehicle width direction. The airbag cushion 104 of the present Embodiment is a roughly flat spherical shape and includes an occupant side panel 114 positioned on the occupant side and a steering wheel side panel 116 positioned on the steering wheel 106 side (see FIG. 1(a)). The occupant side panel 114 and the steering wheel side panel 116 are both circular in shape and have both edges thereof connected to form a single bag shaped chamber 105 as a space for gas to accumulate. Note, as viewed from the occupant, the occupant side panel 114 is positioned closest and so is also called a front panel and the steering wheel side panel 116 is positioned farther away as viewed from the occupant and so is also called a rear panel.

FIG. 2(b) illustrates the airbag cushion 104 of FIG. 2(a) as viewed from the upper left in the vehicle width direction of the steering wheel side panel 116 side. An inflator insertion section 118 is provided in the center of the steering wheel side panel 116 where a part of the inflator (not shown) is inserted.

A straight line elongated notched gas discharge section 120 is provided on the airbag cushion 104 of the airbag device 100 on the upper section of the steering wheel side panel 116 as a feature portion. In addition, second ends 128a, 128b of a first tether 124 (see FIG. 3) described below are connected to the side of the gas discharge section 120. The first tether 124 is a member that causes variation in the amount of gas discharged from the gas discharge section 120 and second ends 128a, 128b of the first tether 124 are exposed through the gas discharge section 120 and connected to the outside of the steering wheel side panel 116.

FIG. 3 illustrates the structure around the first tether 124 of FIG. 2(b). FIG. 3(a) illustrates the first tether 124 and a second tether 122 on the inside of the chamber 105 of the airbag cushion 104. The second tether 122 and the first tether 124 are provided inside the chamber 105 of the airbag cushion 104 as a plurality of tethers. This plurality of tethers become taut when the inside of the chamber 105 fills with gas and they are pulled to the inside of the chamber 105 near the gas discharge section 120 of the steering wheel side panel 116. Thus, the area of the gas discharge section 120 opening is reduced, suppressing the amount of gas that is discharged.

The inside of the chamber 105 being filled with gas, described above, means that of the time from start of operation of the inflator (not shown) where gas is being supplied through the end of operation, the state subsequent to the time when the internal pressure of the chamber 105 reaches a value enabling restraining the occupant. In other words, the state of being filled with gas is not only the state when operation of the inflator is complete but also includes the state where the internal pressure of the chamber 105 reaches a level enabling restraining the occupant during operation of the inflator.

The second tether 122 is formed with a broader width than the first tether 124 and extends from a location close to the upper section inside the occupant side panel 114 (see FIG. 2(b)) to a location close to the upper section inside the steering wheel side panel 116. Herein, the second tether 122 is installed so as to form a broad flat surface forward and backward to the left and the right when taut.

The first tether 124 is a member with a narrower width than that of the second tether 122 and has a single first end 126 and from there branches into two second ends 128a, 128b. The first end 126 of the first tether 124 is connected to a location near the center of the second tether 122 and thus is in a state of being indirectly connected to the inside of the occupant side panel 114 (see FIG. 2(b)) and the inside of the steering wheel side panel 116 via the second tether 122.

The second ends 128a, 128b of the first tether 124 are exposed through the gas discharge section 120 (see FIG. 2(b)) to the outside of the chamber 105 and are connected near the gas discharge section 120 of the steering wheel side panel 116 on the outside of the chamber 105.

FIG. 3(b) is an expanded illustration of the gas discharge section 120 and second ends 128a, 128b of the first tether 124 of FIG. 2(b). As described above, the gas discharge section 120 is formed by cutting a location in the upper section of the steering wheel side panel 116 in a straight line. End sections 130a, 130b in the longitudinal direction of the gas discharge section 120 have a circular shape opening to avoid load concentration.

Of the edges of the gas discharge section 120 of the steering wheel side panel 116, the second ends 128a, 128b of the first tether 124 are respectively connected near the center of the two opposing long sides 120a, 120b. With this configuration, when the second ends 128a, 128b of the first tether 124 are pulled tight together with the second tether 122 (see FIG. 3(a)), the area around the gas discharge section 120 of the steering wheel side panel 116 can efficiently be pulled to the occupant side panel 114, in other words, toward the inside of the chamber 105. In other words, tension on the first tether 124 enables the edges of the gas discharge section 120 to be pulled inside the chamber 105 (see FIG. 3(a)).

FIG. 4 is various cross-sectional views of the airbag cushion 104 of FIG. 1(b). FIG. 4(a) is a cross-sectional view along A-A of the airbag cushion 104 of FIG. 1(b). This A-A cross-sectional view is a longitudinal section in the front-to-back direction of the airbag cushion 104 in a state of expansion and deployment being complete and prior to restraining the occupant.

The second tether 122 and the first tether 124 are pulled tight when the chamber 105 fills with gas. Herein, the gas discharge section 120 of the occupant side panel 114 is pulled towards the occupant side panel 114 inside the chamber 105 by the second ends 128a, 128b of the taut first tether 124 (see FIG. 3(b)), reducing the area of the opening compared to when the first tether 124 is relaxed. The effect thereof is to reduce the amount of gas discharged from the gas discharge section until the occupant comes into contact with the airbag cushion 104 enabling maintaining a high internal pressure in the chamber 105.

The width of the second ends 128a of the first tether 124 are configured to be smaller than the length of the gas discharge section 120 in the longitudinal direction. The first tether 124 does not plug the gas discharge section 120 or block the gas discharge section 120 and so is advantageous in not hindering discharge of gas from the gas discharge section 120.

FIG. 4(b) is a cross-sectional view along B-B of the airbag cushion 104 of FIG. 1(b). The B-B cross-sectional view is also a longitudinal section of the airbag cushion 104 in the front-to-back direction prior to restraining the occupant, similar to FIG. 4(a).

When the chamber 105 is filled with gas, the second tether 122 is pulled tight in the front-to-back direction. Furthermore, the second tether 122 pulling on the first end 126 thereof causes the first tether 124 to pull the gas discharge section 120 inside the chamber 105. Here, pulling on the first end 126 exerts a force on the branched second ends 128a, 128b of the first tether 124 causing the branches to close and become a straight line shape. This inhibits operation of the gas discharge section 120 (see FIG. 3(b)) opening and reduces the area of the opening.

Note that with the first tether 124, shortening of the respective lengths of the branched second ends 128a, 128b increases the force closing the gas discharge section 120. For example, the length of the second ends 128a, 128b can be set to less than half the overall length of the first tether 124.

Figure 5:
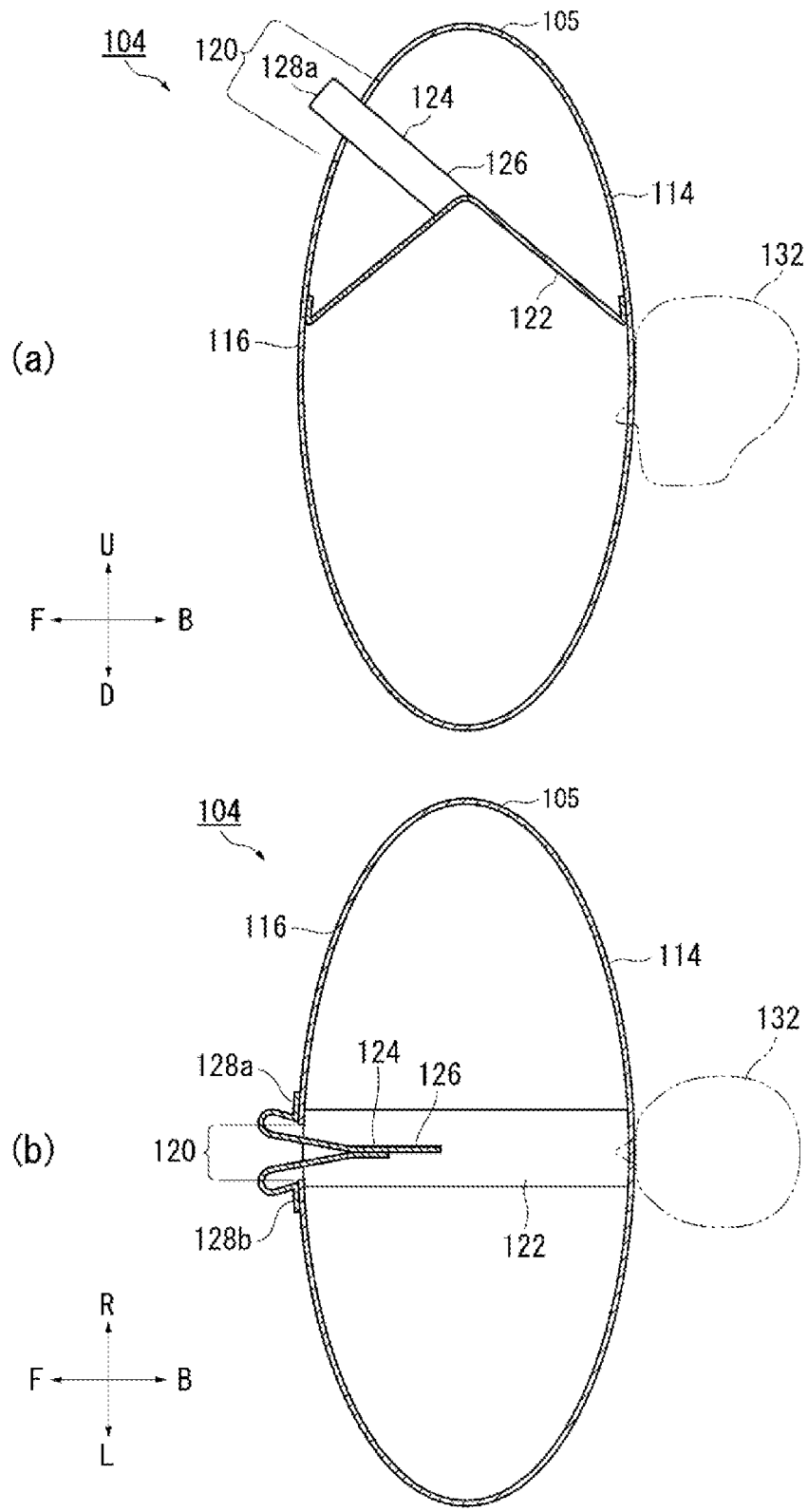
FIG. 5 illustrates the state of the airbag cushion of FIG. 4 restraining an occupant.

FIG. 5 illustrates the state of the airbag cushion 104 of FIG. 4 restraining an occupant. FIG. 5(a) schematically illustrates a state of an occupant 132 coming into contact with the occupant side panel 114 of the airbag cushion 104 of FIG. 5(a). When the occupant 132 comes into contact with the occupant side panel 114, the dimension of the chamber 105 of the airbag cushion 104 in the front-to-back direction shrinks due to being sandwiched between the occupant 132 and the steering wheel 106 (see FIG. 1(a)). Here, as the distance between the occupant side panel 114 and the steering wheel side panel 116 narrows, the second tether 122 relaxes and the first tether 124 also slackens in a similar manner. Thus, pulling on the gas discharge section 120 by the second ends 128a, 128b of the first tether 124 (see FIG. 3(b)) is released enabling the gas discharge section to open up.

FIG. 5(b) schematically illustrates a state of an occupant 132 coming into contact with the occupant side panel 114 of the airbag cushion 104 of FIG. 4(b). Loosening of the second tether 122 and the first tether 124 causes the gas discharge section 120 to open to the left and right, increasing the area of the opening and raising the amount of gas discharged.

As described above, when expansion and deployment of the airbag cushion 104 is complete (see FIG. 4), the first tether 124 is pulled tight, reducing the area of the gas discharge section 120 opening. Furthermore, the occupant coming into contact with the occupant side panel 114 of the airbag cushion 104 (see FIG. 5) slackens the first tether 124 causing the area of the gas discharge section 120 opening to increase. Therefore, the internal pressure of the chamber 105 is maintained by reducing the amount of gas discharged until the occupant 132 comes into contact with the airbag cushion 104 while after contact by the occupant 132, discharge amount increases enabling suppressing the load applied to the occupant 132.

In this manner, this airbag device 100 enables achieving a simple configuration including a long narrow gas discharge section 120 and first tether 124 that can be economically implemented and improving occupant restraint performance and safety.

Modified Example

Modified examples of each of the above-described components are described below. In each of the diagrams FIG. 9 to FIG. 15, the same sign is attached to the same elements as those already described, and descriptions of the previously mentioned elements are omitted. In the following description, components having the same name as a component already described are assumed to have the same function unless otherwise specified, even if marked with a different sign.

FIG. 6 illustrates a Modified Example of the first tether 124 of FIG. 3. FIG. 6(a) illustrates a first Modified Example of the first tether 160. With the first tether 160, a slit 164 is provided in a center location in the longitudinal direction of a first band member 162 that a second band member 166 is passed through, and the root of the band member 166 is connected to the band member 162. This first tether 160 also enables exhibiting the same action and effect as the first tether 124 of FIG. 3.

FIG. 6(*b*) illustrates a second Modified Example of the first tether 180. With the first tether 180, a branch structure is implemented by connecting a second short cord member 184 to a first long cord member 182. This first tether 180 also enables exhibiting the same action and effect as the first tether 124 of FIG. 3. In particular, the cord shaped first tether 180 is a small structure relative to the length of the gas discharge section 120 in the longitudinal direction, there is no risk of plugging or blocking the gas discharge section 120, and gas discharge is not affected.

FIG. 7 illustrates a Modified Example of the gas discharge section 120 of FIG. 3(*b*). FIG. 7(*a*) illustrates a first Modified Example of a gas discharge section 200. The gas discharge section 200 is formed by notching a part of the steering wheel side panel 116 in a rectangular shape. The gas discharge section 200 also enables exhibiting the same action and effect as the gas discharge section 120 of FIG. 3(*b*).

FIG. 7(*b*) illustrates a second Modified Example of a gas discharge section 220. Compared to the gas discharge section 200 of FIG. 7(*a*), the gas discharge section 220 is a rectangle with rounded ends. The gas discharge section 220 does not have internal corners and so load concentration from gas pressure does not readily occur and this enables suitable prevention of damage.

FIG. 7(*c*) illustrates a third Modified Example of a gas discharge section 240. The gas discharge section 240 is almond shaped. The gas discharge section 240 is formed by notching a part of the steering wheel side panel 116 in an oval shape. The gas discharge section 240 also enables exhibiting the same action and effect as the gas discharge section 120 of FIG. 3(*b*).

FIG. 8 illustrates a first reinforcement patch 260 that can be attached around the gas discharge section 120 of the steering wheel side panel 116. FIG. 8(*a*) illustrates the first reinforcement patch 260 by itself. The first reinforcement patch 260 uses the same base material or the like as the steering wheel side panel 116, is formed in a rounded rectangular shape, and has a slit 262 in the center. The first reinforcement patch 260 is attached by sewing or the like around the gas discharge section 120 with the slit 262 overlaid on the gas discharge section 120 (see FIG. 3(*b*)) to protect the area around the gas discharge section 120 from damage.

FIG. 8(*b*) illustrates the installation state of the first reinforcement patch 260 of FIG. 8(*a*). The second ends 128*a*, 128*b* of the first tether 124 can be passed through the gas discharge section 120 (see FIG. 3(*b*)) and the slit 262 of the first reinforcement patch 260 to become exposed on the outside of the chamber 105, and connected by sewing or the like to the steering wheel side panel 116 together with the first reinforcement patch 260.

FIG. 8(*c*) is a cross-sectional view of the first reinforcement patch 260 and the first tether 124 along C-C of FIG. 8(*b*). The first reinforcement patch 260 is attached around the gas discharge section 120 of the steering wheel side panel 116 on the outside of the chamber 105 together with the second ends 128*a*, 128*b* of the first tether 124. With this configuration, the region around the gas discharge section 120 is reinforced to prevent damage, enabling efficient pulling of the area around the gas discharge section 120 inside the chamber 105 when the first tether 124 is taut.

FIG. 8(*d*) is a first Modified Example of the first reinforcement patch 260 and first tether 124 of FIG. 8(*c*). The second ends 128*a*, 128*b* of the first tether 124 can also be sewn to the steering wheel side panel 116 and the first reinforcement patch 260 inside the chamber 105. This configuration also provides reinforcement around the gas discharge section 120 and enables achieving pulling in of the gas discharge section 120.

FIG. 8(*e*) is a second Modified Example of the first reinforcement patch 260 and the first tether 124 of FIG. 8(*c*). After passing through the gas discharge section 120 and the slit 262 of the first reinforcement patch 260, the second ends 128*a*, 128*b* of the first tether 124 can pass around from the upper side to the lower side of the first reinforcement patch 260 and be connected to the steering wheel side panel 116 together with the first reinforcement patch 260. With this configuration, the second ends 128*a*, 128*b* of the first tether 124 can be more firmly connected with the first reinforcement patch 260.

FIG. 8(*f*) is a third Modified Example of the first reinforcement patch 260 and the first tether 124 of FIG. 8(*c*). In this Modified Example, of the steering wheel side panel 116, slits 264*a*, 264*b* are provided on both sides of the gas discharge section 120.

After passing through the gas discharge section 120 and the slit 262 of the first reinforcement patch 260, the second ends 128*a*, 128*b* of the first tether 124 can pass through the slits 264*a*, 264*b* and return inside the chamber 105 and be connected to the steering wheel side panel 116 together with the first reinforcement patch 260. This configuration enables a firm connection of the second ends 128*a*, 128*b* of the first tether 124 to the steering wheel side panel 116 and first reinforcement patch 260.

Note that in each aspect illustrated in FIG. 8, a configuration with only one second end 128*a* can be provided on the first tether 124 with only that second end 128*a* being connected to the first reinforcement patch 260 and the like. With this configuration, the gas discharge section 120 can be pulled inside the chamber 105.

FIG. 9 illustrates a second reinforcement patch 300 that can be attached around the gas discharge section 120 of the steering wheel side panel 116. FIG. 9(*a*) illustrates the second reinforcement patch 300 by itself. The second reinforcement patch 300 differs from the configuration of the first reinforcement patch 260 of FIG. 8(*a*) in being integrally connected to the second ends 128*a*, 128*b* of the first tether 124 (see FIG. 9(*b*)).

FIG. 9(*b*) illustrates the installation state of the second reinforcement patch 300 of FIG. 9(*a*). The second reinforcement patch 300 enables folding back at both sides thereof of the second ends 128*a*, 128*b* that are then passed through the slit 262 and the gas discharge section 120 (see FIG. 3(*b*)), and can be set on the steering wheel side panel 116 by sewing or the like around the gas discharge section 120.

FIG. 9(*c*) is a cross-sectional view of the second reinforcement patch 300 along D-D in FIG. 9(*b*). The second reinforcement patch 300 is attached around the gas discharge section 120 on the outside of the chamber 105 together with the second ends 128*a*, 128*b* of the first tether 124. With this configuration, the region around the gas discharge section 120 is reinforced to prevent damage, enabling efficient pulling of the area around the gas discharge section 120 inside the chamber 105 when the first tether 124 is taut.

FIG. 9(*d*) is a first Modified Example of the second reinforcement patch 300 of FIG. 9(*c*). The second ends 128*a*, 128*b* of the first tether 124 can be passed through the slits 264*a*, 264*b*, inserted inside the chamber 105, and connected to the steering wheel side panel 116 together with the second reinforcement patch 300. This configuration enables a firm connection of the second ends 128a, 128b of the first tether 124 to the steering wheel side panel 116 and first reinforcement patch 260.

Figure 10:
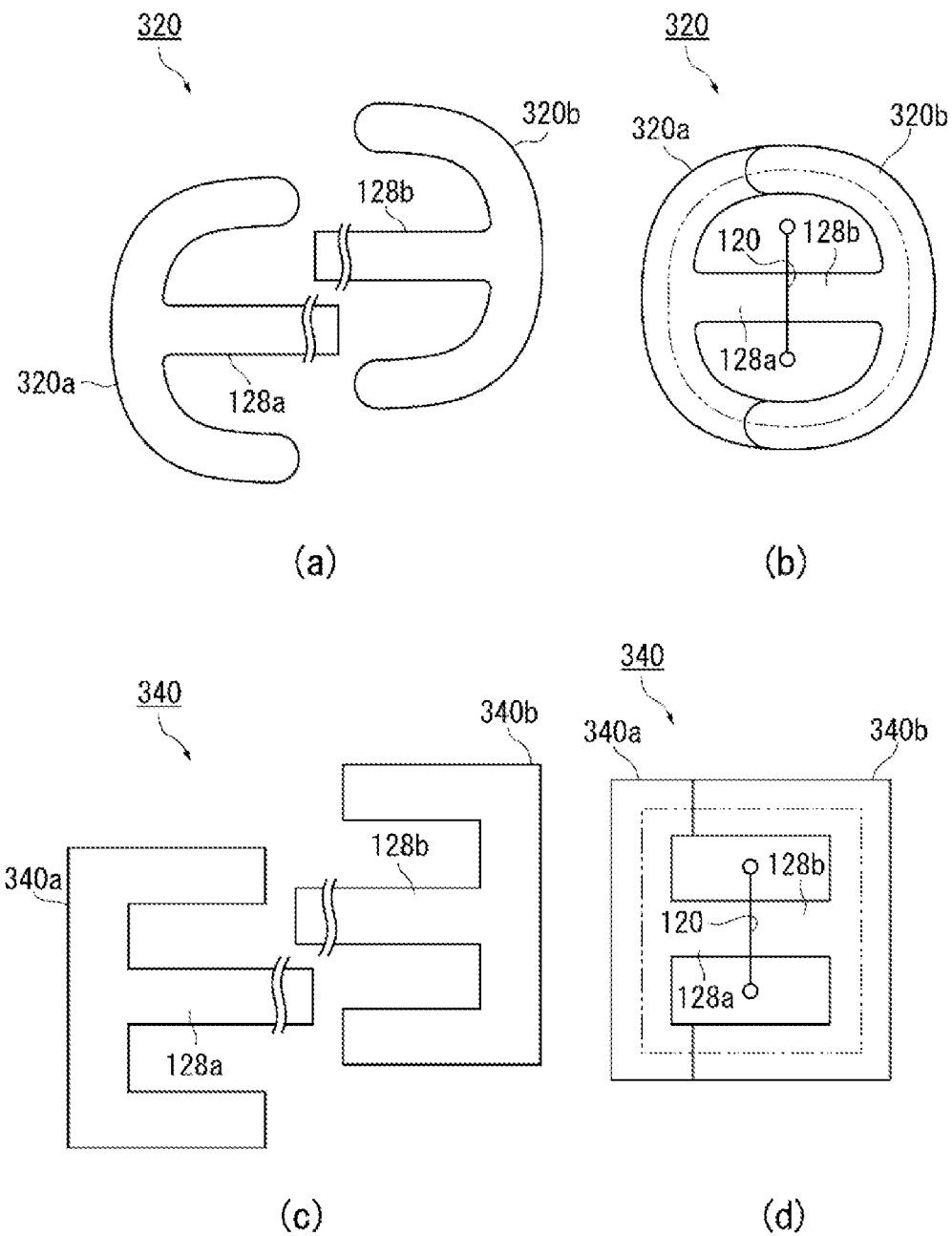
FIG. 10 is the second and third Modified Examples of the second reinforcement patch.

FIG. 10 is the second and third Modified Examples of the second reinforcement patch 300. FIG. 10(a) illustrates a second Modified Example of a second reinforcement patch 320. The second reinforcement patch 320 has a configuration of patches 320a, 320b in a curved shape being integrated respectively with the second ends 128a, 128b of the first tether 124 (see FIG. 3(a)).

FIG. 10(b) is an installation example of the second reinforcement patch 320 of FIG. 10(a). With the second ends 128a, 128b inserted in the gas discharge section 120, the patches 320a, 320b are arranged in a circle and bonded around the gas discharge section 120 to install the second reinforcement patch 320. The second reinforcement patch 320 also enables suitable reinforcement around the gas discharge section 120.

FIG. 10(c) illustrates a third Modified Example of a second reinforcement patch 340. The second reinforcement patch 340 has a configuration of patches 340a, 340b in a square shape being integrated respectively with the second ends 128a, 128b of the first tether 124 (see FIG. 3(a)).

FIG. 10(d) is an installation example of the second reinforcement patch 340 of FIG. 10(c). With the second ends 128a, 128b inserted in the gas discharge section 120, the patches 340a, 340b are arranged in a rectangle shape and bonded around the gas discharge section 120 to install the second reinforcement patch 340. The second reinforcement patch 340 also enables suitable reinforcement around the gas discharge section 120.

Note that in each of the aspects illustrated in FIGS. 9, 10, a configuration with only one of the second ends of the first tether 124 can be provided and for each aspect one of the pair of second reinforcement patches can be integrated with this single end 128a. With this configuration, the gas discharge section 120 can be pulled inside the chamber 105.

FIG. 11 is another Modified Example of the gas discharge section 120 and the first tether 124 of FIG. 3(b). FIG. 11(a) illustrates a three branch gas discharge section 360 and a first tether 362. The gas discharge section 360 is in a state where a prescribed location of the steering wheel side panel 116 is cut at a single point intersection of three straight lines. In addition, the first tether 362 includes three branched second ends 362a to 362c.

Three free ends 360a to 360c are formed at the edge of the gas discharge section 360 by means of the intersection of the three straight lines. The second ends 362a to 362c of the first tether 362 are respectively connected to the free ends 360a to 360c of the gas discharge section 360.

With the gas discharge section 360 and the first tether 362, when the chamber 105 (see FIG. 4) is filled with gas, the free ends 360a to 360c of the gas discharge section 360 are pulled inside the chamber 105 by the taut first tether 362, contracting the gas discharge section 360 and suppressing the amount of gas that is discharged. Furthermore, when the occupant 132 comes into contact with the occupant side panel of the chamber 105 (see FIG. 5), the first tether 362 is slackened causing the gas discharge section 360 to open wide, increasing the amount of gas discharged.

FIG. 11(b) illustrates a four branched gas discharge section 380 and first tether 382. The gas discharge section 380 is in a state where a prescribed location of the steering wheel side panel 116 is cut at a single point intersection of four straight lines, forming four free ends 380a to 380d at the edges. In addition, four branched second ends 382a to 382d of the first tether 382 are connected to the free ends 380a to 380d of the gas discharge section 380.

With the gas discharge section 380 and the first tether 382, when the chamber 105 (see FIG. 4) is filled with gas, the free ends 380a to 380c of the gas discharge section 380 are pulled inside the chamber 105 by the taut first tether 382, contracting the gas discharge section 380 and suppressing the amount of gas that is discharged. Furthermore, when the occupant 132 comes into contact with the airbag cushion 104 (see FIG. 5), the first tether 382 is slackened causing the gas discharge section 380 to open wide, increasing the amount of gas discharged.

Figure 12:
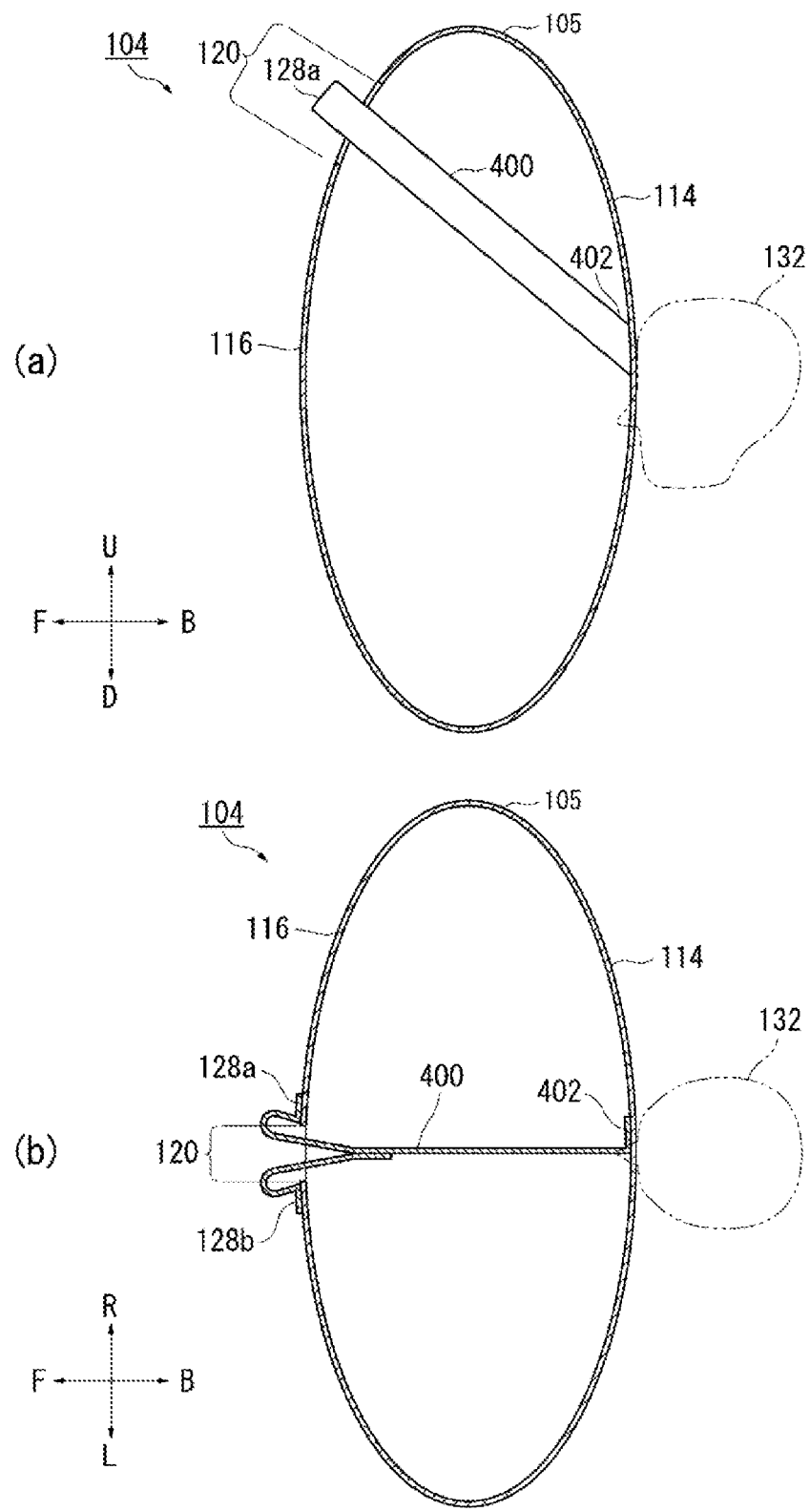
FIG. 12 illustrates a further Modified Example of the first tether of FIG. 5.

FIG. 12 is a view illustrating another modified example of the first tether 124 (first tether 400) of FIG. 5. FIG. 12(a) illustrates a Modified Example of the first tether 400 corresponding to FIG. 5(a). The first end 402 of the first tether 400 described above is connected directly to the occupant side panel 114 of the chamber 105. Therefore, with this Modified Example, the second tether 122 (see FIG. 5(a)) is omitted.

In the present Modified Example as well, when the occupant 132 comes into contact with the occupant side panel 114, the dimension of the chamber 105 shrinks in the front-to-back direction, slackening the first tether 400, releasing the gas discharge section 120 from being pulled on by the first tether 124 [sic] and increasing the area of the gas discharge section 120 opening.

FIG. 12(b) illustrates a Modified Example of the first tether 400 corresponding to FIG. 5(b). As described above, loosening of the first tether 400 causes the gas discharge section 120 to open to the left and right, increasing the area of the opening and raising the amount of gas discharged. In this manner, even with a more simplified configuration of only the first tether 400, with the second tether 122 omitted (see FIG. 5(b)), improvement of occupant restraint performance and safety of the airbag cushion 104 can be achieved.

Note that if, for example, the chamber 105 includes panels other than the occupant side panel 114 and the steering wheel side panel 116, a first end 402 of the first tether 400 can be connected to a panel close to the occupant side panel 114, not only to the occupant side panel 114. With any configuration, connecting the first end 402 of the first tether 400 to a location where the distance with the gas discharge section 120 shortens when the occupant comes into contact with the occupant side panel 114 enables raising the area of the gas discharge section 120 opening at the same time that the occupant is restrained.

Figure 13:
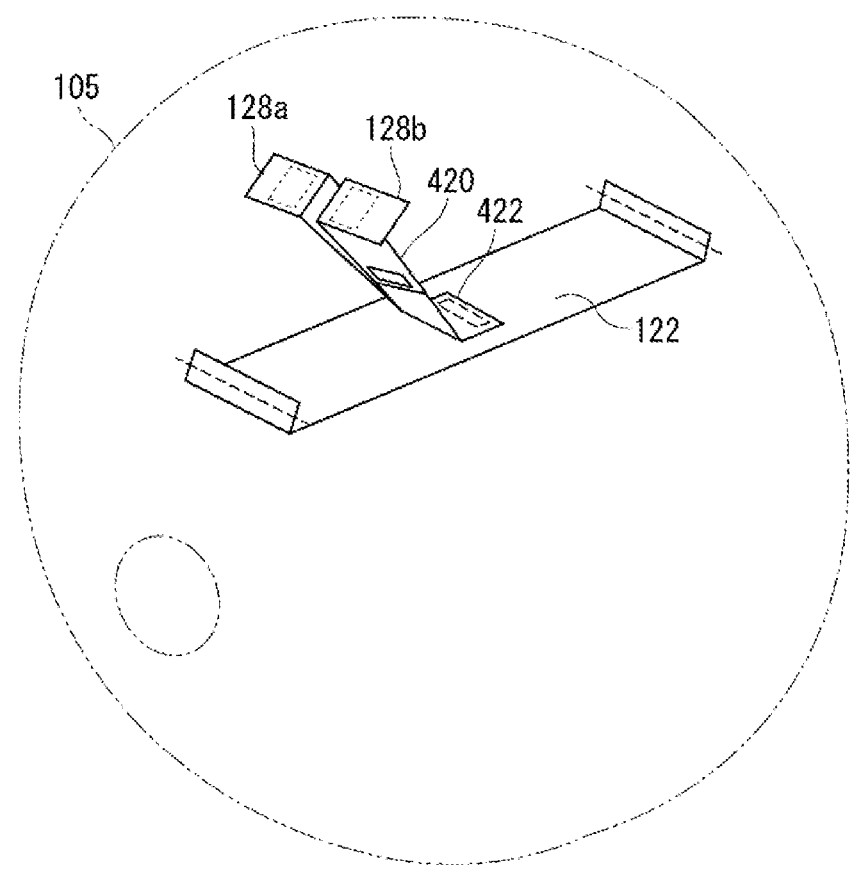
FIG. 13 illustrates a further Modified Example of the first tether of FIG. 3(a).

FIG. 13 illustrates another Modified Example (first tether 420) of the first tether 124 of FIG. 3(a). The first tether 420 differs from the first tether 124 (see FIG. 3(a)) in that a first end 422 is connected to the second tether 122 with the width direction thereof matching the width direction of the second tether 122. The first tether 420 of this configuration also enables producing the same action and effect as that of the first tether 124.

FIG. 14 illustrates a further Modified Example of the first tether 124 of FIG. 3(b). FIG. 14(a) illustrates a Modified Example of the first tether 440. The first tether 440 differs from the first tether 124 of FIG. 3(b) in that a second end 442 is not branched. The second end 442 of the first tether 440 is connected to a first edge of the gas discharge section 120 on the steering wheel side panel 116 on the outside of the chamber 105 (see FIG. 2(b)).

In this Modified Example, a slit 444 is formed on the steering wheel side panel 116 near an edge of the gas discharge section 120 that is opposite the edge that the second end 442 of the first tether 440 is connected to. A first end (not shown) of a first tether 449 passes over the gas discharge section 120 and is inserted through the slit 444 into the chamber 105 (see FIG. 2(b)). Inside the chamber 105, the first end of the first tether 440 may be connected to the second tether 122 of FIG. 3(a) or may be directly connected to the occupant side panel 114 similar to the first tether 400 of FIG. 12(a).

Even with a configuration where a first tether 440 having a non-branched second end 442 is used, the edge of the gas discharge section 120 can be pulled inside the chamber 105 by the first tether 440 until the occupant comes into contact with the occupant side panel 114 to reduce the amount of gas discharged from the gas discharge section 120 and maintain the internal pressure of the chamber 105. Furthermore, when the occupant comes into contact with the occupant side panel 114, the first tether 440 slackens releasing the edge of the gas discharge section 120 causing an increase in the amount of gas discharged from the gas discharge section 120 and suppressing the load applied to the occupant. Therefore, even with the configuration described above, an airbag device for a vehicle that can be inexpensively implemented, has a simple structure, and that improves occupant restraint performance and safety, can be provided.

FIG. 14(b) illustrates a Modified Example of a first tether 460. In this Modified Example, additionally, a loop part 464 is formed on the steering wheel side panel 116 near an edge of the gas discharge section 120 that is opposite the edge that a second end 462 of the first tether 460 is connected to. The loop part 464 is formed by sewing near both ends of a band shaped base material to prescribed sew sections illustrated with rectangular shaped dotted lines and sewing onto the steering wheel side panel 116. The area between these sew sections of the loop part 464 can be separated from the steering wheel side panel 116 enabling the first tether 460 to be passed through.

A first end (not shown) of the first tether 460 passes over the gas discharge section 120, is folded back at the loop part 464, passes through the space between the loop part 464 and the steering wheel side panel 116, and is inserted through the gas discharge section 120 into the chamber 105 (see FIG. 2(b)). Inside the chamber 105, the first end of the first tether 460 may be connected to the second tether 122 of FIG. 3(a) or may be directly connected to the occupant side panel 114 similar to the first tether 400 of FIG. 12(a).

Even when the first tether 460 is used, the edge of the gas discharge section 120 can be pulled inside the chamber 105 by the first tether 460 until the occupant comes into contact with the occupant side panel 114 to reduce the amount of gas discharged from the gas discharge section 120 and maintain the internal pressure of the chamber 105. Furthermore, when the occupant comes into contact with the occupant side panel 114, the first tether 460 slackens releasing the edge of the gas discharge section 120 causing an increase in the amount of gas discharged from the gas discharge section 120 and suppressing the load applied to the occupant. Therefore, even with the configuration described above, an airbag device for a vehicle that can be inexpensively implemented, has a simple structure, and that improves occupant restraint performance and safety, can be provided.

FIG. 15 illustrates a further Modified Example of the gas discharge section 120 of FIG. 2(a). FIG. 15(a) is an example of two gas discharge sections 500, 502 being provided on one steering wheel side panel 116. If two gas discharge sections 500, 502 are provided, two first tethers 124 (FIG. 3(b)) can be provided or the second ends 128a, 128b of one first tether 124 can be connected respectively to the edges of the gas discharge sections 500, 502. Herein, the first end 126 of two first tethers 124 may be connected to one second tether 122 or may each be connected to the occupant side panel 114 as with the first tether 400 of FIG. 12(a).

FIG. 15(b) is an example of three gas discharge sections 500, 502, 504 being provided on one steering wheel side panel 116. If three gas discharge sections 500, 502, 504 are provided, three first tethers 124 can be provided (see FIG. 3(b)) or the second end of the first tether 124 can be a three branch structure and respectively connected to the gas discharge sections 500, 502, 504. In this manner, the number of gas discharge sections provided and position thereof can be suitably set in accordance with the internal pressure of the chamber 105 and the location gas can be discharged from that avoids surrounding structural members.

FIG. 15(c) is an example of one gas discharge section 120 and two vent holes 520, 522 being provided on one steering wheel side panel 116. The vent holes 520, 522 are also locations where gas is discharged from inside the chamber 105. Installing vent holes 520, 522 in combination with the gas discharge section 120 enables adjusting the internal pressure of the chamber 105 so as to match the intended purpose.

FIG. 15(d) is an example of one gas discharge section 540 and one vent hole 542 being provided on one steering wheel side panel 116. The amount of gas discharged can be changed by increasing the diameter of the vent hole. For example, the diameter of the vent hole 542 is larger than that of the vent hole 520 of FIG. 15(c). In this manner, the diameter dimension of the vent hole(s) and position and number of the vent hole(s) can be suitably set according to the target internal pressure of the chamber 105 and locations gas can be discharged to avoid structural members.

Preferred examples of the present invention were described above while referring to the attached drawings. However, the embodiments described above are preferred examples of the present invention, and other embodiments can be implemented or performed by various methods. In particular, unless described otherwise in the specification of the present application, the invention is not limited to the shape, size, configurational disposition, and the like of parts illustrated in detail in the attached drawings. Furthermore, expressions and terms used in the specification of the present application are used for providing a description, and the invention is not limited thereto, unless specifically described otherwise.

Therefore, it is obvious that a person with ordinary skill in the art can conceive various changed examples or modified examples within the scope described in the scope of the claims, which is understood to naturally belong to the technical scope of the present invention.

INDUSTRIAL APPLICABILITY

The present invention can be used as an airbag device for restraining occupants during an emergency.

DESCRIPTION OF CODES

100. Airbag device, 102. Seat, 104. Airbag cushion, 105. Chamber, 106. Steering wheel, 108. Hub, 114. Occupant side panel, 116. Steering wheel side panel, 118. Inflator insertion section, 120. Gas discharge section, 120a, 120b. Long side of gas discharge section, 122. Second tether, 124. First tether, 126. First end, 128a, 128b. Second end, 130a, 130b. End of gas discharge section, 132. Occupant, 160. First Modified Example of first tether 162. First band member, 164. Slit, 166. Second band member, 180. Second Modified Example of first tether, 182. First cord member, 184. Second cord member, 200. First Modified Example of gas discharge section, 220. Second Modified Example of gas discharge section, 240. Third Modified Example of gas discharge section, 260. First reinforcement patch, 262. Slit, 264a, 264b. Slit, 300. Second reinforcement patch, 320. Second Modified Example of second reinforcement patch, 320a, 320b. Patch, 340. Third Modified Example of second reinforcement patch, 340a, 340b. Patch, 360. Modified Example of gas discharge section, 360a to 360c. Free ends, 362. Modified Example of first tether, 362a to 362c. Second ends, 380. Modified Example of gas discharge section, 380a to 380d. Free ends, 382. Modified Example of first tether, 382a to 382d. Second ends, 400. Modified Example of first tether, 402. First end, 420. Modified Example of first tether, 422. First end, 440. Modified Example of first tether, 442. Second end, 444. Slit, 460. Modified Example of first tether, 462. Second end, 464. Loop part, 500, 502, 504. Modified Examples of gas discharge section, 520, 522. Vent holes, 540. Modified Example of gas discharge section, 542. Vent hole

The invention claimed is:

1. An airbag device for a vehicle, comprising:
    an inflator provided on a prescribed location of the vehicle; and
    an airbag cushion that receives gas from the inflator and expands and deploys between the steering wheel and an occupant in the driver seat; wherein
    the airbag cushion includes:
    a chamber for gas accumulation formed in a bag shape including an occupant side panel positioned on the occupant side and a steering wheel side panel positioned on the steering wheel side,
    a notched gas discharge section that is cut in a prescribed location of the steering side panel along a prescribed line, and
    a first tether extending over a prescribed location of the chamber,
    the first tether includes:
    a first end connected to the occupant side panel inside the chamber or near the occupant side panel, and
    one or a plurality of second ends directly connected to the steering wheel side panel,
    the one or a plurality of second ends of the first tether are connected near the edge of the gas discharge section of the steering wheel side panel of the chamber,
    the edge of the gas discharge section can be pulled inside the chamber by a taut first tether, and
    the area of the gas discharge section opening in a state of the edge of the gas discharge section being pulled inside the chamber is smaller than when the first tether is relaxed so as to reduce an amount of gas discharged from the opening in the state of the edge of the gas discharge section being pulled inside the chamber, wherein the first tether does not plug the gas discharge section.

2. The airbag device for a vehicle according to claim 1, wherein when the chamber is filled with gas, the edge of the gas discharge section is pulled inside the chamber by the taut first tether.

3. The airbag device for a vehicle according to claim 1, wherein the first end of the first tether is connected to the occupant side panel of the chamber.

4. The airbag device for a vehicle according to claim 1, wherein the airbag cushion further includes a second tether extending from the occupant side panel to the steering wheel side panel inside the chamber and the first end of the first tether is connected to a prescribed location of the second tether and thus is connected to the occupant side panel or near the occupant side panel via the second tether.

5. The airbag device for a vehicle according to claim 1, wherein the first tether is in the form of a band or a cord.

6. The airbag device for a vehicle according to claim 5, wherein the width of the one or a plurality of second ends of the first tether is smaller than the length of the gas discharge section in the longitudinal direction.

7. The airbag device for a vehicle according to claim 1, wherein the one or a plurality of second ends of the first tether are exposed through the gas discharge section to the outside of the steering wheel side panel and connected to the outside of the steering wheel side panel near the gas discharge section.

8. The airbag device for a vehicle according to claim 1, wherein the airbag cushion further includes a first reinforcement patch attached to the outside of the chamber around the gas discharge section of the steering wheel side panel and the one or a plurality of second ends of the first tether are connected to the first reinforcement patch.

9. The airbag device for a vehicle according to claim 1, wherein the airbag cushion further includes a second reinforcement patch attached to the outside of the chamber around the gas discharge section of the steering wheel side panel, and the one or a plurality of second ends of the first tether are integrally connected to the second reinforcement patch.

10. The airbag device for a vehicle according to claim 1, wherein the airbag cushion further includes a prescribed slit formed near one edge of the gas discharge section and the one or a plurality of second ends of the first tether are exposed through the slit to the outside of the chamber, pass across over the gas discharge section, and are connected near the edge on the other side of the gas discharge section outside the chamber.

11. The airbag device for a vehicle according to claim 10, wherein
    one second end of the first tether is provided,
    the second end is connected on the outside of the chamber near the edge of the gas discharge section,
    the airbag cushion further includes a prescribed loop part provided near the edge of the gas discharge section on the opposite side of the edge that the second end of the first tether is connected to, and
    the first end of the first tether passes over the gas discharge section, is folded back at the loop part, and is inserted through the gas discharge section into the chamber.

12. The airbag device for a vehicle according to claim 1, wherein a plurality of second ends of the first tether are provided and the plurality of second ends are respectively connected near opposing edges of the gas discharge section.

13. The airbag device for a vehicle according to claim 12, wherein
    the gas discharge section is cut in a straight line, notched in a rectangular shape, or notched in an oval shape,
    the plurality of second ends of the first tether is two, and
    the two second ends of the first tether are respectively connected near the center of the opposing two long sides of the edges of the straight line shape, rectangular shaped, or oval shaped gas discharge section.

14. The airbag device for a vehicle according to claim 12, wherein the gas discharge section is formed by a plurality of cuts along intersecting lines at a prescribed location of the steering wheel side panel forming a plurality of free ends on the edges of the gas discharge section, and the plurality of second ends of the first tether are respectively connected to the plurality of free ends formed on the edges of the gas discharge section.

15. The airbag device for a vehicle according to claim 1, wherein the one or a plurality of second ends of the first tether are connected outside of the chamber.

16. An airbag device for a vehicle, comprising:
   an inflator provided on a prescribed location of the vehicle; and
   an airbag cushion that receives gas from the inflator and expands and deploys between the steering wheel and an occupant in the driver seat; wherein
   the airbag cushion includes:
   a chamber for gas accumulation formed in a bag shape including an occupant side panel positioned on the occupant side and a steering wheel side panel positioned on the steering wheel side,
   a notched gas discharge section that is cut in a prescribed location of the steering side panel along a prescribed line, and
   a first tether extending over a prescribed location of the chamber,
   the first tether includes:
   a first end connected to the occupant side panel inside the chamber or near the occupant side panel, and
   one or a plurality of second ends connected to the steering wheel side panel,
   the one or a plurality of second ends of the first tether are connected near the edge of the gas discharge section of the steering wheel side panel of the chamber,
   the edge of the gas discharge section can be pulled inside the chamber by a taut first tether, and
   the area of the gas discharge section opening in a state of the edge of the gas discharge section being pulled inside the chamber is smaller than when the first tether is relaxed so as to reduce an amount of gas discharged from the opening in the state of the edge of the gas discharge section being pulled inside the chamber, wherein the first tether does not plug the gas discharge section, and wherein the edge of the gas discharge section is configured to, when the first tether is taut, avoid plugging the gas discharge section.

* * * * *